United States Patent
Armangau et al.

(10) Patent No.: US 7,320,059 B1
(45) Date of Patent: Jan. 15, 2008

(54) METHODS AND APPARATUS FOR DELETING CONTENT FROM A STORAGE SYSTEM

(75) Inventors: Philippe Armangau, Acton, MA (US); Stephen J. Todd, Shrewsbury, MA (US); John Loonie, Boxboro, MA (US)

(73) Assignee: EMC Corporation, Hopkinton, MA (US)

( * ) Notice: Subject to any disclaimer, the term of this patent is extended or adjusted under 35 U.S.C. 154(b) by 264 days.

(21) Appl. No.: 11/213,233

(22) Filed: Aug. 26, 2005

(51) Int. Cl.
*G06F 12/00* (2006.01)

(52) U.S. Cl. .................. 711/162; 711/100; 711/154; 711/161

(58) Field of Classification Search ............ 711/100, 711/162, 161, 154, 4, 108
See application file for complete search history.

(56) References Cited

U.S. PATENT DOCUMENTS

2006/0004689 A1 * 1/2006 Chandrasekaran et al. ...... 707/1

\* cited by examiner

*Primary Examiner*—Kimberly McLean
(74) *Attorney, Agent, or Firm*—Wolf, Greenfield & Sacks, P.C.

(57) ABSTRACT

One embodiment is directed to a computer system that includes primary and secondary storage systems. When a request to store a content unit is received, it may be determined whether to store the content unit on the primary storage system or the secondary storage system. In another embodiment, a computer may store information relating to an action to be performed in one of the directories of a file system that corresponds to a period of time. When the period of time to which the directory corresponds arrives, the action may be performed. In another embodiment, a content unit stored on a primary storage system may be copied to a secondary storage system in a computer system. After the content unit has been copied, the secondary storage system may send a delete request to the primary storage system to delete the content unit from the primary storage system.

6 Claims, 5 Drawing Sheets

METHODS AND APPARATUS FOR DELETING CONTENT FROM A STORAGE SYSTEM

FIELD OF THE INVENTION

The present invention relates to managing the storage of content.

DESCRIPTION OF THE RELATED ART

Virtually all computer application programs rely on storage that may be used to store computer code and data manipulated by the computer code. A typical computer system includes one or more host computers that execute such application programs and one or more storage systems that provide storage.

The host computers may access data by sending access requests to the one or more storage systems. Some storage systems require that the access requests identify units of data to be accessed using logical volume and block addresses. Such storage systems are known as "block I/O" storage systems. Although the logical volumes presented by the storage system to the host may not map in a one-to-one manner to physical storage devices, they are perceived by the host as corresponding to physical storage devices, and the specification of a logical volume and block address indicates where the referenced data is physically stored within the storage system.

In contrast to block I/O storage systems, some storage systems receive and process access requests that identify data or other content using a content address, rather than an address that specifies where the data is physically or logically stored in the storage system. As used herein, a content address is an address that is computed, at least in part, from the content of its corresponding unit of content, which can be data and/or metadata. For example, a content address for a unit of content may be computed by hashing the unit of content and using the resulting hash value as the content address. Storage systems that identify content by a content address are termed content addressable storage (CAS) systems.

In a CAS system, unlike block I/O storage systems, the address by which a unit of data is accessed (i.e., the content address) does not specify the physical or logical location at which the unit of data is stored. Thus, in a CAS system, if the physical or logical location at which the unit of content is stored changes, the address by which host computers access the unit of content may remain the same. In contrast, in a block I/O storage system, if the logical location at which the unit of content is stored changes, host computers accessing the unit of content must be made aware of the location change and then use the new logical location of the unit of content for future accesses.

SUMMARY OF THE INVENTION

One embodiment is directed to a method for use in a computer system comprising a first storage system comprising at least one first storage device, a second storage system comprising at least one second storage device, and at least one communication link that couples the first storage system and the second storage system, wherein the at least one second storage device is slower than the at least one first storage device. The method comprises acts of: (A) receiving, at the first storage system, a request to store a content unit, the content unit being identifiable by a content address that is computed, at least in part, from the content of the content unit; and (B) determining whether to store the content unit on the first storage system or the second storage system based, at least in part, on a pre-defined policy. Another embodiment is directed to at least one computer readable medium encoded with instructions that, when executed on a computer system, perform the above-described method.

A further embodiment is directed to a computer system comprising: a first storage system comprising at least one first storage device; a second storage system comprising at least one second storage device that is slower than the at least one first storage device; at least one communication link that couples the first storage system and the second storage system; and at least one controller that: receives, at the first storage system, a request to store a content unit, the content unit being identifiable by a content address that is computed, at least in part, from the content of the content unit; and determines whether to store the content unit on the first storage system or the second storage system based, at least in part, on a pre-defined policy.

Another embodiment is directed to a method of scheduling, on a computer, an action to be performed on a content unit at a future time, wherein the computer stores content units in a file system on the computer, the file system having a plurality of directories arranged in a tree, comprising at least one root directory and a plurality of non-root directories that each has a parent directory, wherein at least one of the plurality of directories in the tree corresponds to a period of time subsumed by a period of time corresponding to its respective parent directory. The method comprises acts of: (A) storing, in at least one of the plurality of directories that corresponds to a period of time that includes the future time, information relating to the action; (B) determining, at a time related to the period of time that includes the future time, whether the information is stored in the at least one of the plurality of directories that corresponds to the period of time that includes the future time; and (C) when it is determined in the act (B) that the information is stored in the at least one of the plurality of directories that corresponds to the period of time that includes the future time, performing the action. A further embodiment is directed to at least one computer readable medium encoded with instructions that, when executed on a computer, perform the above-described method.

Another embodiment is directed to a computer comprising: at least one storage device comprising a file system having a plurality of directories arranged in a tree, comprising at least one root directory and a plurality of non-root directories that each has a parent directory, wherein at least one of the plurality of directories in the tree corresponds to a period of time subsumed by a period of time corresponding to its respective parent directory; and at least one controller, coupled to the storage device, that stores content units in the file system and schedules an action to be performed on a content unit at a future time, wherein the at least one controller: stores, in at least one of the plurality of directories that corresponds to a period of time that includes the future time, information relating to the action; determines, at a time related to the period of time that includes the future time, whether the information is stored in the at least one of the plurality of directories that corresponds to the period of time that includes the future time; and when it is determined that the information is stored in the at least one of the plurality of directories that corresponds to the period of time that includes the future time, performs the action.

A further embodiment is directed to a method for use in a computer system comprising a first storage system comprising at least one first storage device, a second storage system comprising at least one second storage device, and at least one communication link that couples the first storage system and the second storage system, wherein the at least one second storage device is slower than the at least one first storage device. The method comprises acts of: (A) receiving, at the second storage system, a first request to store a copy of a content unit stored on the first storage system; (B) in response to the first request, storing the copy of the content unit on the second storage system; and (C) sending a second request from the second storage system to the first storage system to delete the content unit stored on the first storage system. Another embodiment is directed to at least one computer readable medium encoded with instructions that, when executed on a computer system, perform the above-described method.

Another embodiment is directed to a computer system comprising: a first storage system comprising at least one first storage device; a second storage system comprising at least one second storage device that is slower than the at least one first storage device; at least one communication link that couples the first storage system and the second storage system; and at least one controller that: receives, at the second storage system, a first request to store a copy of a content unit stored on the first storage system; in response to the first request, stores the copy of the content unit on the second storage system; and sends a second request from the second storage system to the first storage system to delete the content unit stored on the first storage system.

DETAILED DESCRIPTION

Figure 1:
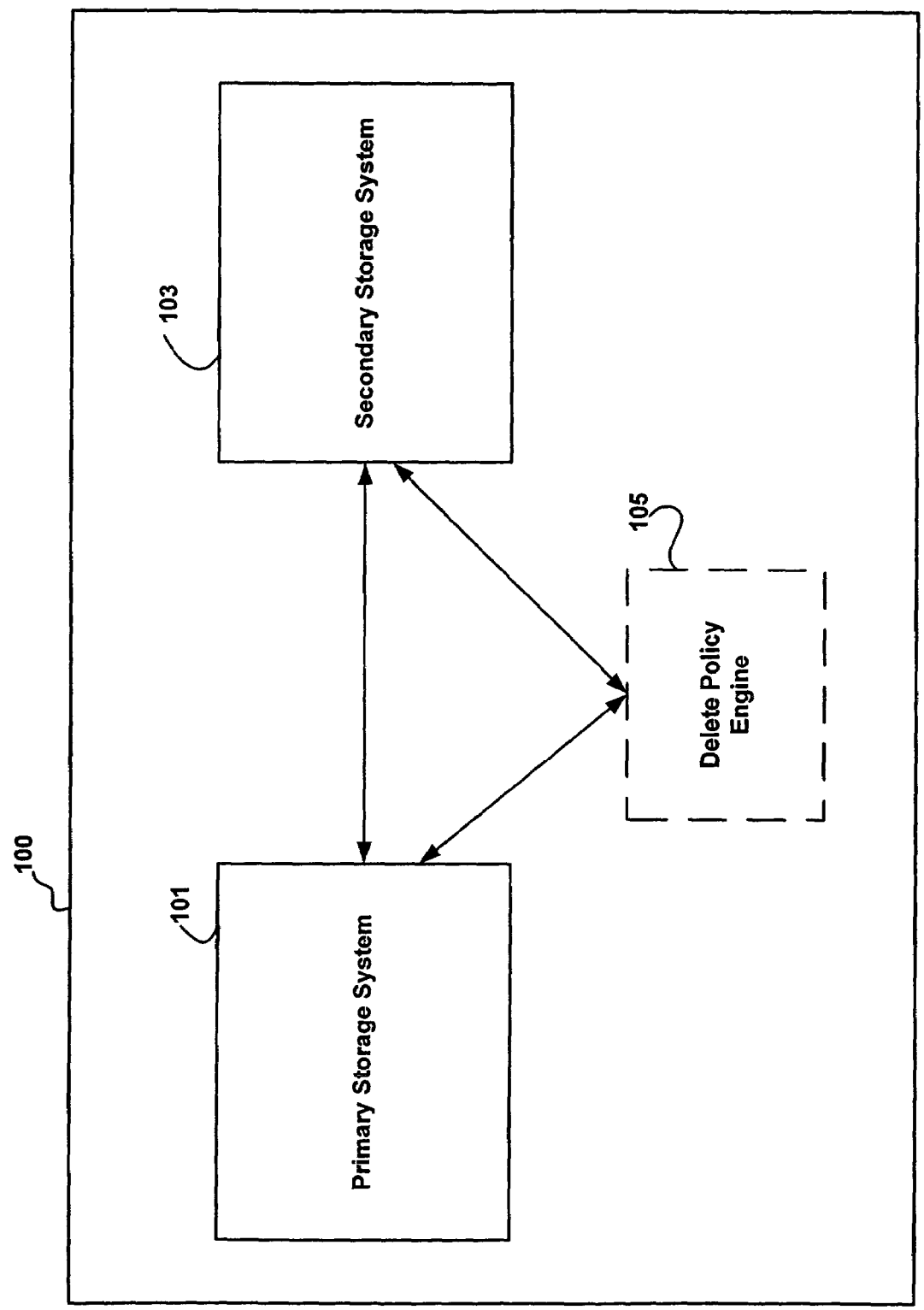
FIG. 1 is a block diagram of a system for moving content units from a primary storage system to a secondary storage system, in accordance with one embodiment of the invention.

In CAS systems, storage of large amounts of data may sometimes be expensive. Applicants have appreciated that customers may desire less expensive storage. Thus, one embodiment of the invention is directed to a content addressable storage system including a primary storage system that provides storage on at least one more expensive storage device and a secondary storage system that provides storage on at least one less expensive storage device. Based upon a user-defined policy, content originally stored to the primary storage system may be moved to the second storage system. This can be done in any of numerous ways. For example, the primary storage system may replicate content to the secondary storage system, and once the content has been replicated to the secondary storage system, the content may be automatically deleted from the primary storage system. When a subsequent request to access the content is received by the primary storage system, the primary storage system may determine that it no longer stores the content and the access request may be serviced from the secondary storage system, which may receive the access request and may locate and return the content.

The servicing of read requests from the secondary storage system may be performed in any suitable way, as the invention is not limited in this respect. In one embodiment, a host computer initially sends requests to access a content unit to the primary storage system. When the content unit is not stored on the primary storage system, the primary storage system may inform the requesting host computer that the content unit is not stored thereon. The host computer may be aware of the secondary storage system so that when it receives the indication from the primary storage system that the requested content unit is not stored thereon, it may send the access request to the secondary storage system.

In another embodiment, the host computer may communicate only with the primary storage system. When the primary storage system determines that it does not store a requested content unit, it may forward the access request (in a manner transparent to the host) to the secondary storage system. The secondary storage system, in response to the request, may return the content unit to the primary storage system, which may then return the content unit to the host computer.

Content may be replicated from the primary storage system to the secondary storage system for any desired reason. For example, the content may be replicated so that in case of failure of a storage device or other component of the primary storage system, a backup copy of the content exists on the secondary storage system.

The content may also be replicated to provide a hierarchical storage management (HSM) capability in the computer system. HSM is a technique by which data may be transparently moved from one storage medium to another storage medium based on a user-defined policy. For example, data that is accessed more frequently may be stored on a faster, but more expensive, storage device, while data that is accessed less frequently may be stored on a slower and less expensive storage device. That is, for example, data stored on magnetic disk drive that has not been accessed for a certain period of time may automatically be moved from the disk to tape. If a user later requests access to the data, the data may automatically be retrieved from the tape device and transferred to the magnetic disk drive.

For example, a primary storage system may provide a certain amount of storage space (e.g., disk-based), while secondary storage system provides additional storage space (e.g., tape-based). The amount of storage space offered by the primary or secondary storage systems may be equal, or the secondary can provide more or less storage space than the primary, as the invention is not limited in this respect.

When content is replicated from the primary storage system to the secondary storage system, the content may be deleted from the primary storage system based on any policy and remain stored on the secondary storage system. For example, content that is believed to be less likely to be accessed with any frequency may be deleted from the primary storage system to free up disk space on the primary storage system. When an access request is received by the primary storage system for such content, the access request may be processed by secondary storage system and the content may be retrieved therefrom.

In one embodiment, the primary storage system may be a content addressable storage (CAS) system. Examples of CAS systems on which aspects of the present invention can be implemented are described in the applications in Table 1 below. However, aspects of the invention related to use with a CAS system are not limited to use with any of the CAS systems described in these applications and the invention may be implemented on any suitable CAS system.

In one embodiment, aspects of the present invention may be used with a CAS system that stores at least two different types of content units: blobs and CDFs as described in at least some of the Table 1 applications. Data may be stored in logical objects referred to as blobs, while metadata (and optionally some data) is stored in logical objects referred to as content descriptor files (CDFs). Each blob and CDF may be identified by a content address that is computed, at least in part, from the content of the blob or CDF. A single CDF may store metadata for multiple blobs and may associate the metadata for a blob with the blob, for example, by storing the content address of the blob with the metadata. That is, the CDF may reference one or more blobs by storing metadata for the blobs and/or the content addresses of the blobs. In one embodiment, when a CDF is moved from the primary storage system to the secondary storage system (e.g., by being replicated to the secondary storage system and deleted from the primary storage system), the blobs referenced by the CDF may also be moved to the secondary storage system. For example, when a CDF is replicated, the blobs that it references may be replicated and when the CDF is later deleted from the primary storage system, all the blobs that it references may also be deleted from the primary storage system.

Alternatively, in another embodiment, CDFs may remain on the primary storage system, while blobs are deleted therefrom and are stored only on the secondary storage system. Applicants have appreciated that CDFs typically use less storage space than blobs. Thus, in one embodiment, after a CDF and the blobs that it references have been replicated from the primary storage system to the secondary storage system, the blobs may be deleted from the primary storage system, while the CDF remains on the primary storage system. Thus, storage space on the primary storage system may be freed by deleting the logical objects that use more storage space (i.e., the blobs). Additionally, the latency in responding to certain access requests may be decreased or maintained by keeping the CDFs, which generally use less storage space, on the primary storage system. That is, if a subsequent access request for a CDF is received, the CDF need not be retrieved from the secondary storage system because it has not been deleted from the primary storage system.

Content may be replicated from the primary storage system to the secondary storage system in any suitable way, as the invention is not limited in this respect. For example, in one embodiment, the primary storage system may include replication software that replicates logical objects (e.g., blobs and CDFs), also referred to as content units, to the secondary storage system. The replication software may maintain a list of logical objects stored on the primary storage system that have not yet been replicated to the secondary storage system and may replicate each logical object on the list to the secondary storage system. This may be done in any suitable way. For example, the replication software may send a write request for a logical object from the primary storage system to the secondary storage system to replicate the logical object to the secondary storage system. After a logical object is replicated, it may be removed from the list. When new logical objects are received by the primary storage system for storage, they may be added to the list of logical objects not yet replicated.

Once content has been replicated from the primary storage system to the secondary storage system, the content may be deleted from the primary storage system at any suitable time and in any suitable way, as the invention is not limited in this respect. In one embodiment, a delete policy engine may be used to perform this task. An example of a computer system 100 including a primary storage system 101, a secondary storage system 103, and a delete policy engine 105 is shown in FIG. 1. Primary storage system 101 may replicate content units to secondary storage system 103 in any of the ways discussed above. Delete policy engine 105 may be configured to delete content units from primary storage system 101 based on any desired policy, as the invention is not limited in this respect. In one embodiment, delete policy engine 105 may be configured to delete content units based on a temporal characteristic (e.g., any content units that were stored on primary storage system more than three months ago).

Figure 2:
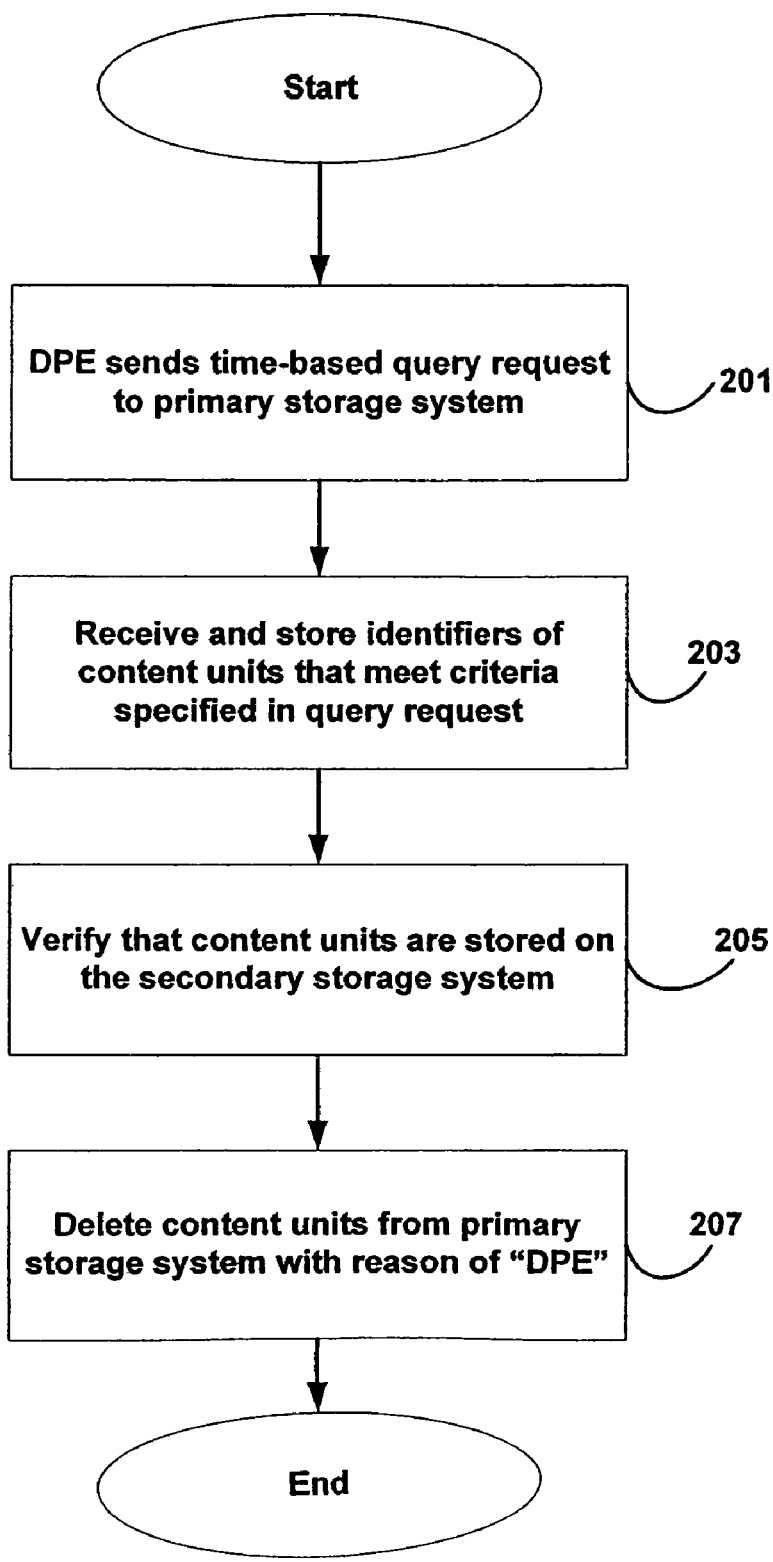
FIG. 2 is a flow chart illustrating an example of a process for deleting content units from the primary storage system.

Delete policy engine 105 may delete content units in any suitable way, as the invention is not limited in this respect. FIG. 2 is a flow chart of an example of one process that may be used to delete content units from primary storage system 101. However, the process of FIG. 2 is only one example of a process that may be used and the invention is not limited to using the illustrative process of FIG. 2.

The process of FIG. 2 begins at act 201, where delete policy engine 105 sends a time-based query request to primary storage system 101 to identify content units stored on primary storage system 101 before a certain period of time. A query request is a request to identify content units that meet one or more criteria specified in the request and a time-based query request is one where the criterion specified in the request is a time period during which content units were stored on the storage system. Thus, a time-based query request is a request that the storage system identify content units stored on the storage system during the time period specified in the request. As mentioned above, delete policy engine may be configured to delete content units stored on the storage system before a certain time. Thus, the time-based query request may request that primary storage system 101 identify content units stored before this time.

In one embodiment, the delete policy engine may use a different time period in the time-based query request for different virtual pools on primary storage system 101. Virtual pools are discussed in detail in application Ser. Nos. 10/910,985; 10/911,330; 10/911,248; 10/911,247; and 10/911,360, listed in Table 1 below. A virtual pool is a logical grouping of content units. Content units may be logically grouped together in virtual pools for any suitable reason. For example, content units may be grouped together to control access to certain content units. That is, a first host computer may be permitted only to access content units in Virtual Pool A, while a second host computer may be permitted only to access content units in Virtual Pool B. Thus, for example, delete policy engine may send a time-based query request that requests identifiers of all content units in Virtual Pool A stored during a first time period (e.g., before three months ago), but send a time-based query request that requests identifiers of all content units in Virtual Pool B stored during a different time period (e.g., before one month ago). Thus, content units stored in Virtual Pool A that are at least three months old may be deleted, while content units in Virtual Pool B that are at least one month old may be deleted.

After the time-based query request is sent, the process then continues to act 203, where delete policy engine receives the identifiers from primary storage system 101 that identify content units stored on primary storage system 101 before the time specified in the request. Delete policy engine 105 may add these identifiers to a list of identifiers to be deleted. In one embodiment in which primary storage system 101 is a CAS system, the identifiers may be content addresses for content units that were stored on the storage system before the specified time.

The process next continues to act 205, where delete policy engine 105 verifies that each content unit identified by an identifier in the list is stored on secondary storage system 103. This verification may be performed in any suitable way, as the invention is not limited in this respect. For example, in one embodiment for use with a secondary storage system that supports an "exists" request, delete policy engine 105 may send an exists request that includes the identifier for a content unit to secondary storage system 103. An exists request is a request for a storage system to verify that a content unit identified by an identifier specified in the request is stored on the storage system. In one embodiment, delete policy engine may send a separate exists request to secondary storage system for each identifier in the list. Alternatively, the delete policy engine may include multiple identifiers in one or more exists requests, such that secondary storage system 103 verifies that the content unit corresponding to each identifier in the request is stored thereon.

When delete policy engine verifies that each content unit identified by an identifier in the list is stored on secondary storage system, the process continues to act 207, wherein delete policy engine 105 may send a delete request for each of the content units to primary storage system 101, which may delete the content units. In one embodiment, primary storage system may allow a reason for deletion to be specified in a delete request. This may be done for any suitable reason. For example, primary storage system may maintain an audit log of deletions that records information about each deleted content unit, so that if a content unit is deleted (i.e., from both primary storage system 101 and secondary storage system 103) and it is later desired to access the deleted content unit, the time at which the content unit was deleted and/or the reason for deletion may be determined. Thus, in accordance with one embodiment, when delete policy engine deletes a content unit from primary storage system 101, delete policy engine 101 may specify a reason for deletion that may later be used to deny the delete from being replicated to secondary storage system 101, as discussed below in more detail. For example, delete policy engine may specify "DPE" as the reason for deletion, which may indicate to the secondary storage system that the content unit identified in a delete request should not be deleted.

The audit log may be implemented in any suitable way, as the invention is not limited in this respect. In one embodiment, the audit log may be implemented using a reflection for each deleted content unit. For example, when the storage system receives a request to delete a content unit, the storage system may create another content unit, referred to herein as a reflection, to replace the content unit and include information that may be used to track the deletion of the content unit. The reflection may be stored on the storage system (or elsewhere) and the content unit requested for deletion may be deleted or designated for deletion at a later time. The reflection may include any suitable information. For example, the reflection may include a portion (or all) of the content of the content unit to be deleted, information identifying the content unit to be deleted, and/or audit information. The audit information may include, for example, the time of deletion of the content unit, the user or application program that generated the request to delete the content unit, the network address of the computer that generated the request to delete the content unit, the size of the content unit to be deleted, and/or any other suitable information.

In one embodiment, the reflection may also include a flag that indicates that the reflection is a reflection and/or not another type of content unit (e.g., a blob or CDF). The flag may be included in the reflection in any suitable way, as the invention is not limited in this respect. For example, the flag may be part of the content of the reflection. In embodiments of the invention where the reflection is stored on the storage system as a file in a file system, the flag may be part of the file name of the reflection. However, the embodiment directed to storing the reflection is not limited to including the flag in the file name of a file storing a reflection, nor to even storing a reflection in a file system file. In embodiments of the invention implemented on a CAS system, the reflection may be assigned a content address computed, at least in part, from the content of the reflection. When used with such embodiments, the flag indicating that the content unit is a reflection may form a part of the content address of the reflection or may be provided in any other manner. The CAS system may store content units as files in a file system and use the content address of the content unit as the file name (or part of the file name) of the file for the content unit. When used with such a system, the flag indicating that a content unit is a reflection may be located in the content address of the reflection and/or the file name of the file for the reflection.

In one embodiment, the reflection may identify the content unit that it corresponds to so that it can be determined to which content unit the information stored in the reflection pertains, and so that the information stored in the reflection can be found. A reflection of a particular content unit may identify the content unit in any suitable way. For example, the content of the reflection may include information identifying the content unit (e.g., the file name of the content unit when it is stored in a file system). In embodiments of the invention for use with a CAS system, the content address of the content unit may be included in the reflection. For example, the content address for the deleted content unit may be included in the content of the reflection or may be included in the content address of the reflection. Reflections are described in greater detail in application Ser. Nos. 11/034,613, 11/034,737, and 11/034,732, listed in Table 1 below.

As discussed in greater detail below, reflections may be used to indicate that a content unit that is stored on both the primary and secondary storage systems and is subsequently deleted from the primary storage system should not be deleted from the secondary storage system. Reflections are only an example of one way in which this may be accomplished. The invention is not limited to using reflections to prevent replication of delete requests from the primary storage system to the secondary storage system, as this may be done in any suitable way.

Content may be distributed between the primary and secondary storage systems in any suitable way, as the invention is not limited in this respect. For example, in one embodiment, all content may initially be written to the primary storage system and subsequently copied and/or moved to the secondary storage system. Alternatively, content may initially be written to either the primary or secondary storage system.

In one embodiment, secondary storage system 103 is configured as a replication target for primary storage system 101. That is, content units that are stored on primary storage system 101 may be replicated to secondary storage system 103. After being replicated, content units may be deleted from primary storage system for any desired reason. For example, as described above, a content unit that is still in use and that has been replicated to secondary storage system 103 may be deleted to free up disk space on primary storage system 101, with it being desirable to retain a copy of the content unit on secondary storage system 103 to enable future access. Alternatively, a content unit that is no longer in use and is no longer needed may be deleted entirely, such that it is desirable to also delete the content unit from the replication target (i.e., secondary storage system 103). Thus, in one embodiment, delete requests received by primary storage system are also replicated to its replication target (i.e., secondary storage system 103). For example, when a request to delete a content unit is received by primary storage system 101, primary storage system 101 may delete the content unit and then replicate the delete request to secondary storage system 103 to delete the content unit therefrom.

Deletes may be replicated from primary storage system 101 to secondary storage system 103 in any suitable way, as the invention is not limited in this respect. For example, when a delete request is received by primary storage system 101, primary storage system 101 may store delete audit information for the content unit (e.g., time of deletion, reason for deletion, and/or any other suitable information) and may delete the content unit. The primary storage system 101 may then send a delete request for the content unit to secondary storage system 103 and may include the delete audit information along with the delete request.

In one embodiment, the reason for deletion specified in the delete request may be used to prevent secondary storage system 103 from deleting content units which are still in use and which, though intended for deletion from primary storage system 101, are not intended to be deleted from secondary storage system 103. For example in the illustrative process of FIG. 2, at act 207, the delete policy engine may send a delete request to delete a content unit to primary storage system 101, specifying "DPE" as the reason for deletion (i.e., that the delete is one initiated by the delete policy engine and not by a host and/or application program). The "DPE" reason may be used as a signal to secondary storage system 103 to not delete the content unit. Primary storage system 101 may delete the content unit and forward the delete request to its replication target (i.e., secondary storage system 103). Secondary storage system 103 may receive the delete request and recognize that the reason for the deletion is "DPE." Because the reason for deletion is "DPE," secondary storage system 103 may not delete the content unit.

In another embodiment, when a delete request with "DPE" specified as the reason for deletion is received by the primary storage system 101, the primary storage may recognize that the reason for the deletion is "DPE" and may not propagate the delete request to the secondary storage system.

In the example above, the delete policy engine is used in a computer system where primary storage system 101 replicates delete requests to secondary storage system 103. It should be appreciated that the invention is not limited in this respect, as the secondary storage system need not be configured as a replication target for primary storage system and the invention is not limited to any particular implementation.

In the examples above, the allocation of content units between the primary and secondary storage systems is managed by replicating writes and deletes from the primary storage system to the secondary storage system and informing the secondary storage system to ignore certain replicated deletes. However, the invention is not limited to a system in which writes and/or deletes are replicated as content units may be allocated between the primary and secondary storage system in any suitable way. In embodiments in which deletes are not replicated from the primary storage system to the secondary storage system, it may not be necessary to specify a reason for deletion that indicates to the secondary storage system to not process replication of the delete request.

As discussed above, at act 205 (FIG. 2) delete policy engine 105 may verify that content units to be deleted are replicated to secondary storage system 103 before sending delete requests to primary storage system 101 to delete the content units from primary storage system 101. If one or more content units to be deleted are not yet stored on secondary storage system 103, delete requests for these content units may not be sent to primary storage system 101. In one embodiment, delete policy engine may note that these content units are not yet replicated to secondary storage system 103 and may subsequently check periodically to determine if the content units have been replicated. Once a content unit has been replicated, delete policy engine may send a request to primary storage system 101 to delete the content unit. Alternatively, delete policy engine 105 may simply not send requests to delete these content units from primary storage system 101 until another time-based query request is issued. When delete policy engine 105 issues another time-based query request, primary storage system 101 may again identify these content units and delete policy engine may again attempt to verify that the content units are stored on secondary storage system 103.

In one embodiment, delete policy engine may be configured to send time-based query requests at a particular interval (e.g., once per week) to determine if there are any content units stored on primary storage system 101 that are to be deleted. However, the invention is not limited in this respect, as the delete policy engine may send time-based query requests at any suitable frequency and in any suitable manner.

In the example above, the phrase "DPE" was used as a reason for deletion to signal to secondary storage system 103 that a delete request for one or more content units should be ignored. It should be appreciated that any suitable information may be used to connote that the delete policy engine is the reason for the deletion, as the invention is not limited in this respect.

The delete policy engine 105 may be implemented in any suitable way, as the invention is not limited in this respect. In one embodiment, delete policy engine may be software code (e.g., a program, microcode, etc.). The delete policy engine software code may be executed on any suitable computer (as indicated by the dotted lines of delete policy engine 105 in FIG. 1), as the invention is not limited in this respect. For example, the delete policy engine may be executed on primary storage system 101, secondary storage system 103, a computer external to both primary storage system 101 and secondary storage system 103, and/or elsewhere. In embodiments in which delete policy engine software code is executed on a computer external to both primary storage system 101 and secondary storage system 103, the computer may be, for example, an appliance in computer system 100 or may be a computer external to computer system 100.

In another embodiment, rather than using a separate entity (e.g., delete policy engine 105) to delete content units from the primary storage system, the primary storage system may itself be aware of the HSM policy. For example, the primary storage system may be configured to operate according to a particular HSM policy. For example, a policy may be specified that indicates that content units stored more than one month prior should be copied to the secondary storage system and deleted from the primary storage system. The primary storage system may periodically determine which content units stored thereon are more than a month old, copy these content units to the secondary storage system, and delete these content units from the primary storage system. Because the primary storage system is aware that these deletions are for HSM purposes and not because the content units are no longer needed, primary storage system may not replicate (e.g., forward) the delete requests to the secondary storage system.

In one embodiment, a single HSM policy may be specified for all of the content units stored on the storage system. However, the invention is not limited in this respect, as more than one HSM policy may be specified for the storage system, with each HSM policy relating to a particular set of content units. For example, in embodiments in which the primary storage system has multiple virtual pools, different HSM policies may be provided for different virtual pools.

Figure 3:
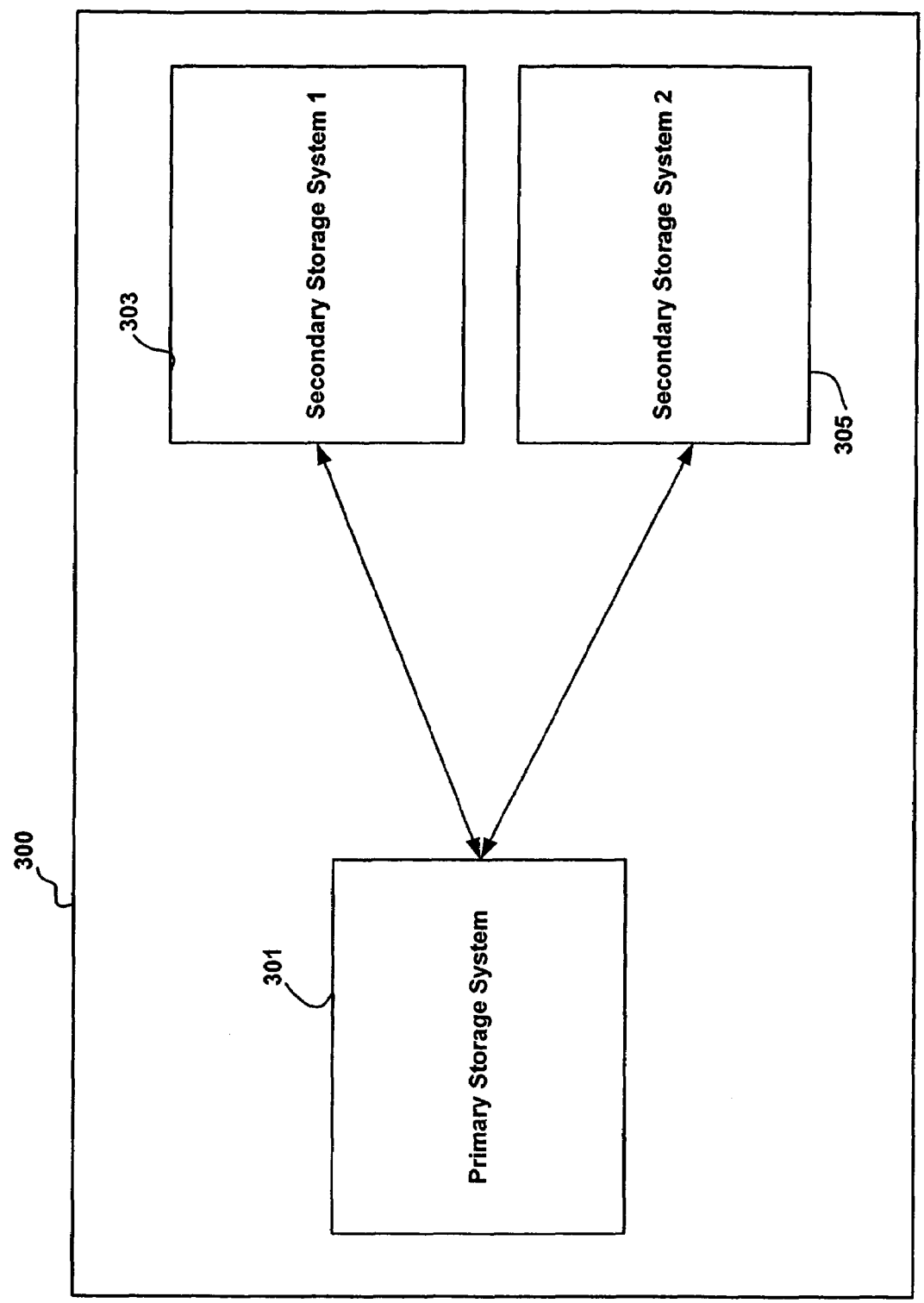
FIG. 3 is a block diagram of a system, having one primary storage system and multiple secondary storage systems, upon which embodiments of the invention may be implemented.

In one embodiment, the computer system may have more than one secondary storage system. For example, as shown in FIG. 3, computer system 300 includes a primary storage system 301, a first secondary storage system 303, and a second secondary storage system 305. Content units moved from primary storage system 301 (e.g., for HSM purposes) may be stored on either secondary storage system 303, secondary storage system 305, or both storage system 303 and storage system 305. Distribution of content units among the primary and secondary storage systems can be done in any suitable way, including those discussed above. For example, primary storage system 301 may periodically determine which content units stored thereon are more than a month old (or any other suitable time period specified in the HSM policy), copy these content units to either secondary storage system 303, secondary storage system 305 or both, and may delete these content units from the primary storage system 301. As in the example above, because primary storage system 301 is aware that these deletions are for HSM purposes and not because the content units are no longer needed, primary storage system may not replicate (e.g., forward) the delete requests to the secondary storage system(s).

When a host computer sends an access request to primary storage system 301 for a content unit that has been moved to secondary storage system 303 and/or secondary storage system 305, primary storage system 301 may determine that it does not store the requested content unit and the access request may be presented to secondary storage system 303 and/or secondary storage system 305 for processing.

The access request sent by the host computer to primary storage system 301 may be any type of access request, as the invention is not limited in this respect. For example, the access request may be a read request, a write request, a query request, or any other type of access request.

The presentation of the access request that fails in the primary storage system to the secondary storage system may be performed in any suitable way, as the invention is not limited in this respect. For example, in one embodiment, when primary storage system 301 determines that it does not store the requested content unit, it may indicate to the host computer that the requested content unit is not stored thereon. The host computer may then send the access request to secondary storage system 303. If secondary storage system 303 does not store the content unit, host computer may then send the access request to secondary storage system 305. In another embodiment, when primary storage system 301 indicates to the host computer that it does not store the requested content unit, the host computer may send the access request concurrently to both secondary storage system 303 and secondary storage system 305. The above technique is one wherein the host has visibility to the secondary and primary storage systems. In some systems, it may be desirable to have the host only interact with the storage system 300 itself, rather than the computers therein.

Thus, in another embodiment, storage system 300 may perform the access request fail over. This can be done in numerous ways and the invention is not limited in this respect. In one embodiment, when primary storage system 301 determines that it does not store the requested content unit, it may forward the access request to one or both of the secondary storage systems. The access request may either be sent first to secondary storage system 303 and then, if secondary storage system 303 does not store the content unit, to secondary storage system 305, or may be sent concurrently to both secondary storage system 303 and secondary storage system 305. The secondary storage system that stores the content unit may, in response to the request, return the content unit to primary storage system 301, which may then return the content unit to the host computer.

In another embodiment, when the storage system 300 copies a content unit to secondary storage system 303 and/or secondary storage system 305 and deletes the content unit from primary storage system 301, the storage system 300 may create a placeholder for the deleted content unit on the primary storage system 301. The placeholder may indicate to which secondary storage system(s) the content unit has been copied. Thus, when a host computer requests access to the content unit, the primary storage system 301 may find the placeholder for the content unit, determine that the content unit is deleted, and return the placeholder (or a portion of the placeholder) to the host computer. The host computer may use the information in the placeholder to determine which secondary storage system stores the content unit and may send the access request to the secondary storage system indicated in the placeholder.

The placeholder may implemented in any suitable way, as the invention is not limited in this respect. For example, in one embodiment, the placeholder may be a file. In embodiments in which primary storage system 301 is a CAS system, the file name may include all or a part of the content address of the deleted content unit to which it corresponds.

As discussed above, the access request received by the primary storage system may be a query request, which is a request to identify content units that satisfy one or more criteria specified in the request. A query request may be received and processed in any suitable way, as the invention is not limited in this respect. In one embodiment, a query request is received and processed by both the primary storage system and the secondary storage system. The primary storage system and the secondary storage system may each return the content units that satisfy the criterion or criteria specified in the request. As discussed above, copies of content units stored on the primary storage system may also be stored on the secondary storage system (e.g., when a content unit is replicated from the primary storage system to the secondary storage system, but has not yet been deleted from the primary storage system). When a content unit stored on both the primary storage system and the secondary storage system satisfies the criterion or criteria specified in the query request, the content unit may be identified twice in response to the query request. In one embodiment, duplicate entries (i.e., content units identified by both the primary storage system and secondary storage system) may be filtered out so that the application program that initiated the request does not receive duplicates in response to a query request.

A query request may be sent to both the primary and secondary storage systems in any suitable way, as the invention is not limited in this respect. In one embodiment, the host computer may send the request to both the primary and secondary storage systems. In another embodiment, the host computer may send the request to the primary storage system which may forward the request to the secondary storage system.

The response to a query request may be returned to the host in any suitable way, as the invention is not limited in this respect. In one embodiment, the primary and secondary storage systems may each send a response to the query request to the host computer and duplicates may be filtered by software on the host computer (e.g., an application programming interface that is used by the application program to communicate with the storage systems) before the results are returned to the host computer. In another embodiment, the secondary storage system may send its response to the query request to the primary storage system, which may combine its response with the response received from the secondary storage system, remove duplicates, and return the combined response to the host. Alternatively, the primary storage system may send its response to the secondary storage system, which may combine the primary storage system's response with its response, remove duplicates, and return the combined response to the host.

In the example of FIG. 3, computer system 300 includes two secondary storage systems (i.e., secondary storage system 303 and secondary storage system 305). However, it should be appreciated that the invention is not limited in this respect, as computer system 300 may have one, three, or any other suitable number of secondary storage systems.

In another embodiment of the invention, deletion of content units moved from a primary storage system to a secondary storage system may be performed by the secondary storage system. This may be done in any suitable way, as the invention is not limited in this respect. For example, when a content unit is replicated to the secondary storage system, the secondary storage system may send a delete request to the primary storage system to delete the content. The delete request may be sent immediately or the secondary storage system may schedule a delete event for a future time and send the delete request when the future time arrives.

Figure 4:
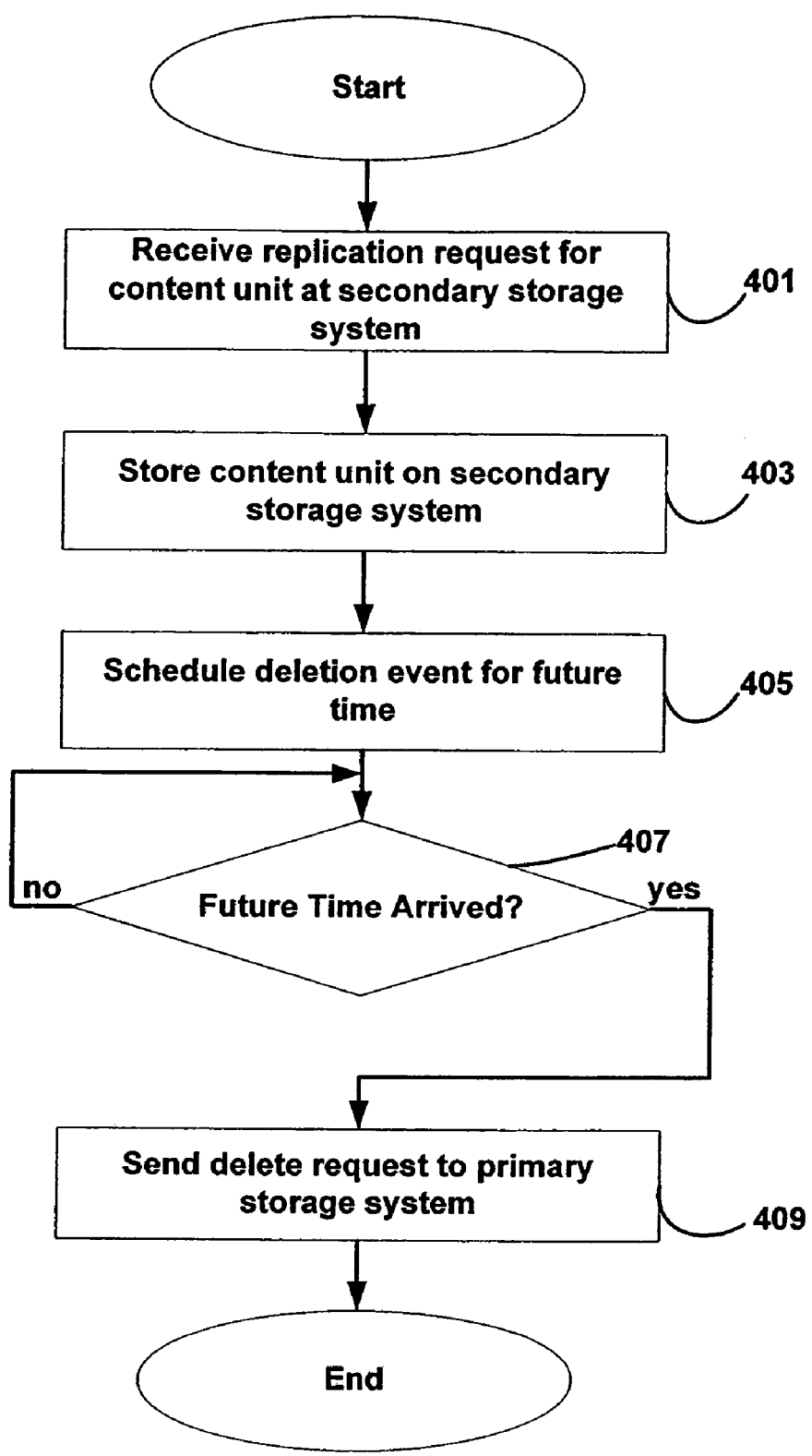
FIG. 4 is a flow chart illustrating an example of a process by which a secondary storage system may delete content from a primary storage system, in accordance with one embodiment.

An example of a process by which the secondary storage system may delete a content unit from the primary storage system is shown in FIG. 4. The process of FIG. 4 begins at act 401, where the secondary storage system receives a replication request from the primary storage system to store a content unit. The process then continues to act 403, where the secondary storage system stores the content unit. The process next continues to act 405, where the secondary storage system schedules a deletion event for a future time. The future time may be, for example, a time defined by an HSM policy as a time at which the content unit should be removed from the primary storage system. Use of this technique may be desirable, for example, when it is desired to create a copy of a content unit on the secondary storage system shortly after it is stored on the primary storage system (e.g., for back-up purposes), but it is also desired to keep a copy on the primary storage system for some duration (e.g., a time period when the content unit is most likely to be accessed).

The process next continues to act 407, wherein the process waits until the future time at which the delete event is scheduled has arrived. When the future time has arrived, the process continues to act 409, where the secondary storage system sends a delete request for the content unit to the primary storage system. After act 409, the process ends.

The process shown in FIG. 4 is an example of a process that may be used for deleting one content unit from the primary storage system. However, the invention is not limited to using a single process for a single content, as the deletion, by the secondary storage system, of content units stored on the primary storage system may be implemented in any suitable way. For example, a first process may be used to schedule future delete events for content units, while a second process periodically checks a queue of these delete events and sends delete requests to the primary storage system when the scheduled time for a delete event arrives.

Secondary storage system may schedule the delete request in any suitable way, as the invention is not limited in this respect. In one embodiment, secondary storage system may store content units in a time-based directory. A time based directory structure is one in which directories and files are organized based, at least in part, on the time at which the content units were stored and/or created by the source (e.g., an application program). Any suitable time based directory structure may be used, as the invention is not limited in this respect. In one embodiment, the time-based directory structure may be organized as a plurality of hierarchical directories, where each directory represents a period of time and each subdirectory represents a period of time that is subsumed by the period of time of its parent directory. Files may be stored in the bottom-level or "leaf" directories (i.e., directories that represent the smallest units of time) and the leaf directory in which a particular file is stored may be selected based on a time of storage or a time of creation of the file.

Figure 5:
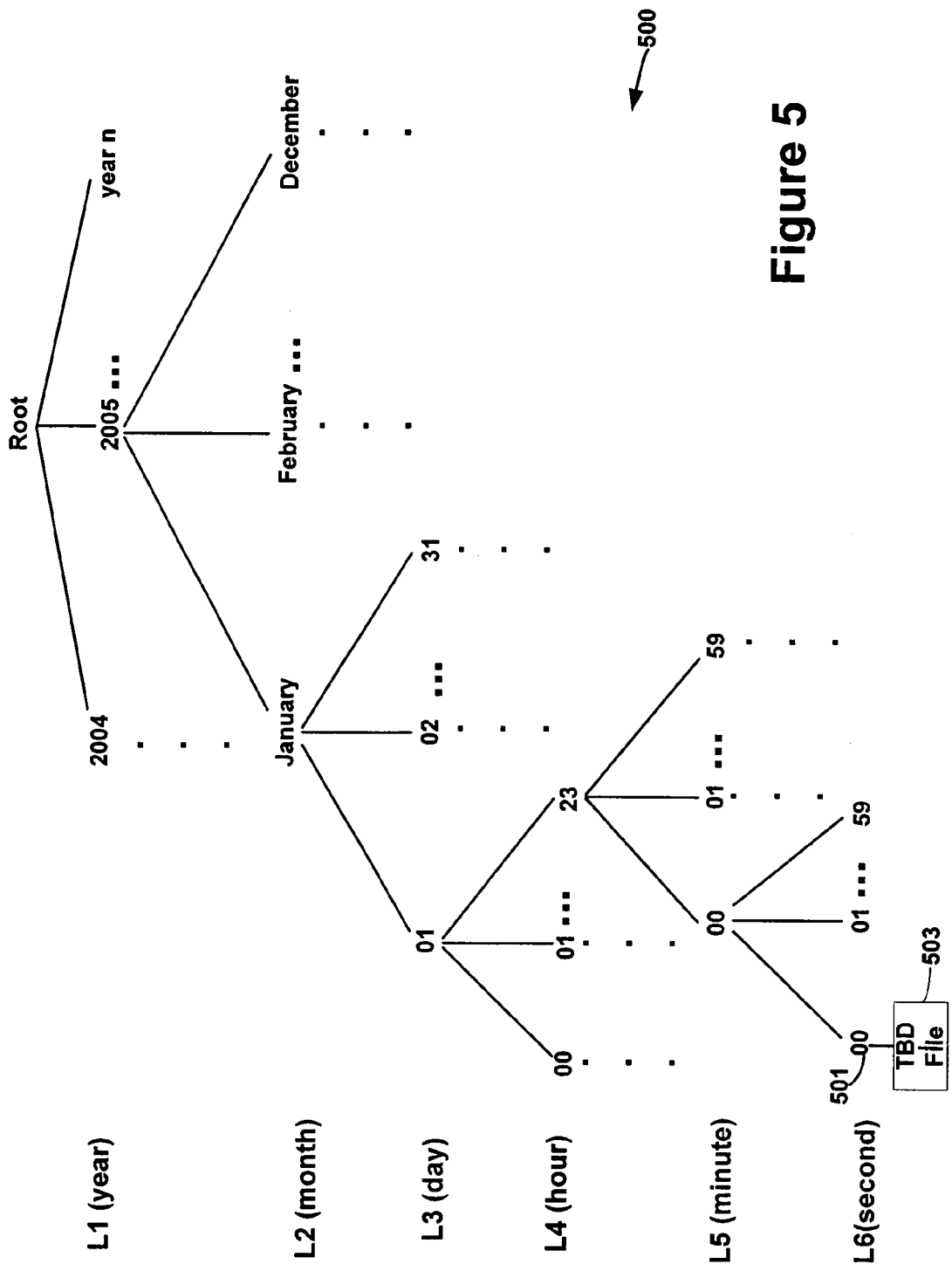
FIG. 5 is a diagram of a time-based directory structure which may be used with embodiments of the invention.

An example of such a time based directory structure is shown in FIG. 5. FIG. 5 shows a directory structure 500 having six levels (labeled L1-L6), wherein directories at level L1 designate the year in which the file was stored, directories at level L2 designate the month, directories at level L3 designate the day, directories at level L4 designate the hour, directories at level L5 designate the minute, and directories at level L6 designate the second. It should be appreciated that the entire hierarchy of directories in directory structure 500 is, for the sake of clarity, not expanded and that each non-leaf directory shown in FIG. 5 may have one or more subdirectories that are not shown in FIG. 5.

As discussed above, files may be stored in the leaf directory that corresponds to the time at which they were stored and/or created. Thus, for example, a file stored on Jan. 1, 2005 at 11:00 PM may be stored in the L6 directory 501, which has a path of /2005/January/01/23/00/00, wherein "2005" is the L1 directory corresponding to the year 2005, "January" is a subdirectory of the 2005 directory corresponding to the month of January 2005, the subdirectory "01" of the "January" directory is the L3 directory corresponding to the $1^{st}$ day of January 2005, the subdirectory "23" of the "01" directory is the L4 directory corresponding to the $24^{th}$ hour of the $1^{st}$ day of January 2005, the subdirectory "00" of the "23" directory is the L5 directory corresponding to the $1^{st}$ minute of the $24^{th}$ hour of the $1^{st}$ day of January 2005, and the subdirectory "00" of the "00" L5 directory is the L6 directory corresponding to the 1$^{st}$ second of the 1$^{st}$ minute of the 24$^{th}$ hour of the 1$^{st}$ day of January 2005.

A content unit may be stored in the time-based directory that corresponds to the time at which the content unit was received for storage by the secondary storage system. Examples of systems which employ a time-based directory structure are described in greater detail in application Ser. Nos. 11/107,520, 11/107,063, and 11/107,194, listed below in Table 1, each of which is incorporated by reference herein in its entirety.

When a content unit is replicated to a secondary storage system the content unit may be stored in the time-based directory of directory structure 500 that corresponds to its time of receipt by the secondary storage system. Additionally, a "To-Be-Deleted" file may be placed in one of the time-based directories that corresponds to a future time. The future time may be a time when it is desired to delete the content unit from the primary storage system and may be specified by a user-defined HSM policy on the secondary storage system. The storage system may have a single HSM policy for all content units stored thereon or may have a separate HSM policy for each virtual pool on the storage system, as discussed above.

The "To-Be-Deleted" file may specify the content unit to be deleted from the primary storage system (e.g., using the content address of the content unit or otherwise). The secondary storage system may periodically scan directories in the directory structure that correspond to the current time for "To-Be-Deleted" files. When a TBD file is found, the secondary storage system may send a request to the primary storage system to delete the content unit identified by the "To-Be-Deleted" file. For example, a To-Be-Deleted (TBD) file 503 may be stored in directory 501, which corresponds to Jan. 1, 2005 at 11:00 PM. The TBD file 503 may be stored in directory 501 at a time prior to Jan. 1, 2005 at 11:00 PM and may indicate that a request to the primary storage system to delete the content unit identified in the TBD file should be sent on or after Jan. 1, 2005 at 11:00 PM.

In the example of FIG. 5, the TBD file 503 is stored in a leaf directory. However, the invention is not limited in this respect, as TBD files may be stored in any suitable directory in the time-based directory structure. In one embodiment, time-based directories may have non-time-based subdirectories, referred to as TBD subdirectories. The TBD files may be stored in the TBD subdirectories. The scheduled time of deletion for a content unit identified in a TBD file stored in a TBD subdirectory may be the time corresponding to the parent directory of the TBD subdirectory.

In the examples above, a time-based directory is used to aid in the scheduling of delete events by storing TBD files in directories corresponding to a planned future time of deletion. However, the invention is not limited to scheduling future events in this manner, as the delete events may be scheduled in any suitable way.

In some of the examples above a content address was used as the identifier in identifying content units. The invention is not limited to use with a content address as any suitable identifier may be used.

The above-described embodiments of the present invention can be implemented on any suitable computer or system. Examples of suitable computers and/or systems are described in the patent applications listed below in Table 1 (collectively "the CAS applications"), each of which is incorporated herein by reference. It should be appreciated that the computers and systems described in these applications are only examples of computers and systems on which the embodiments of the present invention may be implemented, as the invention is not limited to implementation on any of these content addressable storage systems, or to content addressable storage systems at all.

TABLE 1

| Title | Serial No. | Filing Date |
|---|---|---|
| Content Addressable Information, Encapsulation, Representation, And Transfer | 09/236,366 | Jan. 21, 1999 |
| Access To Content Addressable Data Over A Network | 09/235,146 | Jan. 21, 1999 |
| System And Method For Secure Storage Transfer And Retrieval Of Content Addressable Information | 09/391,360 | Sep. 7, 1999 |
| Method And Apparatus For Data Retention In A Storage System | 10/731,790 | Dec. 9, 2003 |
| Methods And Apparatus For Facilitating Access To Content In A Data Storage System | 10/731,613 | Dec. 9, 2003 |
| Methods And Apparatus For Caching A Location Index In A Data Storage System | 10/731,796 | Dec. 9, 2003 |
| Methods And Apparatus For Parsing A Content Address To Facilitate Selection Of A Physical Storage Location In A Data Storage System | 10/731,603 | Dec. 9, 2003 |
| Methods And Apparatus For Generating A Content Address To Indicate Data Units Written To A Storage System Proximate In Time | 10/731,845 | Dec. 9, 2003 |
| Methods And Apparatus For Modifying A Retention Period For Data In A Storage System | 10/762,044 | Jan. 21, 2004 |
| Methods And Apparatus For Extending A Retention Period For Data In A Storage System | 10/761,826 | Jan. 21, 2004 |
| Methods And Apparatus For Indirectly Identifying A Retention Period For Data In A Storage System | 10/762,036 | Jan. 21, 2004 |
| Methods And Apparatus For Indirectly Identifying A Retention Period For Data In A Storage System | 10/762,043 | Jan. 21, 2004 |
| Methods And Apparatus For Increasing Data Storage Capacity | 10/787,337 | Feb. 26, 2004 |
| Methods And Apparatus For Storing Data In A Storage Environment | 10/787,670 | Feb. 26, 2004 |
| Methods And Apparatus For Segregating A Content Addressable Computer System | 10/910,985 | Aug. 4, 2004 |
| Methods And Apparatus For Accessing Content In A Virtual Pool On A Content Addressable Storage System | 10/911,330 | Aug. 4, 2004 |
| Methods and Apparatus For Including Storage System Capability Information In An Access Request To A Content Addressable Storage System | 10/911,248 | Aug. 4, 2004 |

TABLE 1-continued

| Title | Serial No. | Filing Date |
|---|---|---|
| Methods And Apparatus For Tracking Content Storage In A Content Addressable Storage System | 10/911,247 | Aug. 4, 2004 |
| Methods and Apparatus For Storing Information Identifying A Source Of A Content Unit Stored On A Content Addressable System | 10/911,360 | Aug. 4, 2004 |
| Software System For Providing Storage System Functionality | 11/021,892 | Dec. 23, 2004 |
| Software System For Providing Content Addressable Storage System Functionality | 11/022,022 | Dec. 23, 2004 |
| Methods And Apparatus For Providing Data Retention Capability Via A Network Attached Storage Device | 11/022,077 | Dec. 23, 2004 |
| Methods And Apparatus For Managing Storage In A Computer System | 11/021,756 | Dec. 23, 2004 |
| Methods And Apparatus For Processing Access Requests In A Computer System | 11/021,012 | Dec. 23, 2004 |
| Methods And Apparatus For Accessing Information In A Hierarchical File System | 11/021,378 | Dec. 23, 2004 |
| Methods And Apparatus For Storing A Reflection On A Storage System | 11/034,613 | Jan. 12, 2005 |
| Method And Apparatus For Modifying A Retention Period | 11/034,737 | Jan. 12, 2005 |
| Methods And Apparatus For Managing Deletion of Data | 11/034,732 | Jan. 12, 2005 |
| Methods And Apparatus For Managing The Storage Of Content | 11/107,520 | Apr. 15, 2005 |
| Methods And Apparatus For Retrieval Of Content Units In A Time-Based Directory Structure | 11/107,063 | Apr. 15, 2005 |
| Methods And Apparatus For Managing The Replication Of Content | 11/107,194 | Apr. 15, 2005 |
| Methods And Apparatus For Managing the Storage Of Content In A File System | 11/165104 | Jun. 23, 2005 |
| Methods And Apparatus For Accessing Content Stored In A File System | 11/165103 | Jun. 23, 2005 |
| Methods And Apparatus For Storing Content In A File System | 11/165102 | Jun. 23, 2005 |

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments of the present invention comprises at least one computer-readable medium (e.g., a computer memory, a floppy disk, a compact disk, a tape, etc.) encoded with a computer program (i.e., a plurality of instructions), which, when executed on a processor, performs the above-discussed functions of the embodiments of the present invention. The computer-readable medium can be transportable such that the program stored thereon can be loaded onto any computer environment resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

It should be appreciated that in accordance with several embodiments of the present invention wherein processes are implemented in a computer readable medium, the computer implemented processes may, during the course of their execution, receive input manually (e.g., from a user).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. In a computer system comprising a first storage system comprising at least one first storage device, a second storage system comprising at least one second storage device, and at least one communication link that couples the first storage system and the second storage system, wherein the at least one second storage device is slower than the at least one first storage device, wherein the second storage system stores content units in a file system on the second storage system, the file system having a plurality of directories arranged in a tree, comprising at least one root directory and a plurality of non-root directories that each has a parent directory, wherein at least one of the plurality of directories in the tree corresponds to a period of time subsumed by a period of time corresponding to its respective parent directory, a method comprising acts of:

(A) scheduling, at the second storage system, a time of deletion for a content unit from the first storage system by storing, in at least one of the plurality of directories that corresponds to a period of time that includes the scheduled time of deletion, an indication to delete the content unit from the first storage system;

(B) receiving, at the second storage system, a first request to store a copy of the content unit stored on the first storage system;

(C) in response to the first request, storing the copy of the content unit on the second storage system; and (D) sending a second request from the second storage system to the first storage system to delete the content unit stored on the first storage system.

2. The method of claim 1, wherein the act (D) further comprises acts of:

determining, at a time related to the period of time that includes the schedule time of deletion, whether the indication is stored in the at least one of the plurality of directories that corresponds to the period of time that includes the scheduled time of deletion; and when it is determined that the indication is stored in the at least one of the plurality of directories that corresponds to the period of time that includes the scheduled time of deletion, sending the second request.

3. At least one computer readable medium encoded with instructions that, when executed on a computer system, performs a method, the computer system comprising a first storage system comprising at least one first storage device, a second storage system comprising at least one second storage device, and at least one communication link that couples the first storage system and the second storage system, wherein the at least one second storage device is slower than the at least one first storage device, wherein the second storage system stores content units in a file system on the second storage system, the file system having a plurality of directories arranged in a tree, comprising at least one root directory and a plurality of non-root directories that each has a parent directory, wherein at least one of the plurality of directories in the tree corresponds to a period of time subsumed by a period of time corresponding to its respective parent directory, the method comprising acts of:

(A) scheduling, at the second storage system, a time of deletion for a content unit from the first storage system by storing, in at least one of the plurality of directories that corresponds to a period of time that includes the scheduled time of deletion, an indication to delete the content unit from the first storage system;

(B) receiving, at the second storage system, a first request to store a copy of the content unit stored on the first storage system;

(C) in response to the first request, storing the copy of the content unit on the second storage system; and (D) sending a second request from the second storage system to the first storage system to delete the content unit stored on the first storage system.

4. The at least one computer readable medium of claim 3, wherein the act (D) further comprises acts of:

determining, at a time related to the period of time that includes the schedule time of deletion, whether the indication is stored in the at least one of the plurality of directories that corresponds to the period of time that includes the scheduled time of deletion; and when it is determined that the indication is stored in the at least one of the plurality of directories that corresponds to the period of time that includes the scheduled time of deletion, sending the second request.

5. A computer system comprising:

a first storage system comprising at least one first storage device;

a second storage system comprising at least one second storage device that is slower than the at least one first storage device, wherein the second storage system comprises a file system in which the second storage system stores content units, the file system having a plurality of directories arranged in a tree, comprising at least one root directory and a plurality of non-root directories that each has a parent directory, wherein at least one of the plurality of directories in the tree corresponds to a period of time subsumed by a period of time corresponding to its respective parent directory;

at least one communication link that couples the first storage system and the second storage system; and at least one controller that:

schedules, at the second storage system, a time of deletion for the content unit;

stores, in at least one of the plurality of directories that corresponds to a period of time that includes the scheduled time of deletion, an indication to delete the content unit from the first storage system;

receives, at the second storage system, a first request to store a copy of a content unit stored on the first storage system;

in response to the first request, stores the copy of the content unit on the second storage system; and sends a second request from the second storage system to the first storage system to delete the content unit stored on the first storage system.

6. The computer system of claim 5, wherein the at least one controller:

determines, at a time related to the period of time that includes the schedule time of deletion, whether the indication is stored in the at least one of the plurality of directories that corresponds to the period of time that includes the scheduled time of deletion; and when it is determined that the indication is stored in the at least one of the plurality of directories that corresponds to the period of time that includes the scheduled time of deletion, sends the second request.

* * * * *